United States Patent
Sasame et al.

(10) Patent No.: US 8,529,977 B2
(45) Date of Patent: Sep. 10, 2013

(54) GREEN TEA BEVERAGE PACKED IN CONTAINER

(75) Inventors: Masami Sasame, Makinohara (JP); Hitoshi Kinugasa, Makinohara (JP); Kenji Shimaoka, Makinohara (JP); Takashi Soeda, Makinohara (JP)

(73) Assignee: Ito En, Ltd., Tokyo (JP)

( * ) Notice: Subject to any disclaimer, the term of this patent is extended or adjusted under 35 U.S.C. 154(b) by 0 days.

(21) Appl. No.: 13/203,473

(22) PCT Filed: Feb. 26, 2010

(86) PCT No.: PCT/JP2010/053083
§ 371 (c)(1),
(2), (4) Date: Oct. 7, 2011

(87) PCT Pub. No.: WO2010/098443
PCT Pub. Date: Sep. 2, 2010

(65) Prior Publication Data
US 2012/0141650 A1    Jun. 7, 2012

(30) Foreign Application Priority Data
Feb. 27, 2009 (JP) .................................. 2009-047421

(51) Int. Cl.
*A23F 3/00* (2006.01)

(52) U.S. Cl.
USPC ........... 426/597; 426/396; 426/435; 426/590; 426/655; 514/23; 514/53

(58) Field of Classification Search
None
See application file for complete search history.

(56) References Cited

U.S. PATENT DOCUMENTS

| | | | |
|---|---|---|---|
| 4,996,069 A * | 2/1991 | de Hey et al. ................. | 426/248 |
| 6,268,009 B1 * | 7/2001 | Ekanayake et al. ........... | 426/597 |
| 2006/0134197 A1 * | 6/2006 | Uchida et al. ................. | 424/464 |
| 2009/0117252 A1 * | 5/2009 | Satake et al. ................. | 426/597 |
| 2009/0155446 A1 * | 6/2009 | Reiss et al. ................... | 426/650 |

FOREIGN PATENT DOCUMENTS

| | | |
|---|---|---|
| JP | 4-228028 | 8/1992 |
| JP | 6-303904 | 11/1994 |
| JP | 6-343389 | 12/1994 |
| JP | 8-126472 | 5/1996 |
| JP | 10-286178 | 10/1998 |
| JP | 11-56242 | 3/1999 |
| JP | 11-262359 | 9/1999 |
| JP | 2001-258477 | 9/2001 |
| JP | 2001-286260 | 10/2001 |
| JP | 3590051 | 8/2004 |
| JP | 2005-130734 | 5/2005 |
| JP | 2007-117006 | 5/2007 |
| JP | 4136922 | 6/2008 |

OTHER PUBLICATIONS

"Oi OCHA Tennensui Ryokucha" News Release (online) Jul. 4, 2008 <URL:http://www.itoen.co.jp/news/2008/070402.html>.
"Oi OCHA Tennensui de ireta Ryokucha" News Release (online) Jul. 5, 2007 <URL:http://www.itoen.co.jp/news/2007/070502.html>.
"Oi OCHA Tennensui Ryokucha Suzuyaka" News Release (online) Jul. 2, 2009 <URL:http://www.itoen.co.jp/news/2009/070203.html>.
International Search Report and Written Opinion mailed May 25, 2010 in International Application No. PCT/JP2010/053083.
Written Reply filed in connection with the corresponding International Application No. PCT/JP2010/053083.

* cited by examiner

*Primary Examiner* — D. Lawrence Tarazano
*Assistant Examiner* — Tamra L Dicus
(74) *Attorney, Agent, or Firm* — Foley & Lardner LLP

(57) ABSTRACT

Disclosed is a novel green tea beverage packed in a container which shows a good aroma release in the mouth and a lingering aftertaste, has a richness and concentration feeling in the flavor, and can be drunk delectably even in a cold state. Specifically disclosed is a green tea beverage packed in a container characterized in that: the concentration of saccharides, i.e., the sum of monosaccharides and disaccharides, is 150-500 ppm; the ratio by concentration of the disaccharides to the monosaccharides (disaccharides/monosaccharides) is 2.0-8.0; the ratio by concentration of electron-localized catechins to the aforesaid saccharides (electron-localized catechins/saccharides) is 1.8-4.0; and the ratio by content of furfural to geraniol (furfural/geraniol) is 0.5-3.0. It is preferred that the ratio by concentration of the aforesaid saccharides to soluble solid matters originating in tea leaves (saccharides/(soluble solid matters originating in tea leaves× 100)) is 5.0 to 10.0.

5 Claims, No Drawings

GREEN TEA BEVERAGE PACKED IN CONTAINER

TECHNICAL FIELD

The present invention relates to a green tea beverage packed in a container that contains an extraction of green tea that is extracted from a green tea as a major component, which is filled into a plastic bottle or a can or the like.

BACKGROUND ART

With regard to the flavor of a green tea beverage, various inventions have been suggested from various viewpoints such as elevation of original odor and good taste of a green tea, or match to the taste of a consumer, and the like.

For example, Patent Document 1 discloses a method of manufacturing a water-soluble tea extract having flavor by adding enzymes to a tea extraction residue to hydrolyze it.

Patent Document 2 discloses a tea beverage that is obtained by two step extractions, i.e., extracting tea leaves in 80 to 100° C. hot water for 30 to 90 seconds, and then cooling the extract to 30 to 50° C. by adding cold water for 120 to 300 seconds, and then extracting it, wherein the tea beverage has high odor in the same degree as that of a high temperature-extracted tea beverage, and deep delicious taste and rich richness in the same degree as that of a low temperature-extracted tea beverage, and weak sourness.

Patent Document 3 discloses a low temperature extraction method of preventing generation of off flavor, which is so-called retort smell that occurs at the time of sterilization treatment.

Patent Document 4 discloses a method of mixing extraction liquids of refined green tea (Gyokuro tea) and deep-steamed tea for improving the flavor.

In addition, Patent Document 5 discloses a method of manufacturing a product that has a balance of delicious taste and aroma with at least 2 or more kinds of extraction water of low temperature extraction and high temperature extraction.

Patent Document 6 suggests a method in which live tea leaves are roasted with an oven, whereby to boost the unique aroma of fired tea by heating and improve tea flavor.

Patent Document 7 suggests a method of manufacturing a green tea beverage packed in a tight-sealed container by blending an extraction of green tea, which is extracted by low temperature aqueous media such as 45 to 70° C. ion-exchanged water and the like from tea leaves (green tea), with an extract from live tea leaves extracted with hot water as it is, or a live tea leaf extract condensed and/or dried therefrom, which is intended to provide a green tea beverage packed in a tight-sealed container, which has freshly-brewed tea aroma and balanced flavor.

In addition, Patent Document 8 discloses a method of manufacturing a green tea beverage that is excellent in flavor, and has a good balance of aroma components, and has no unpleasant sediments, which comprises two-divided tea extraction steps, i.e., as one step, extraction of green tea leaves under pressure to obtain a pressure-extraction liquid (step A), and as another step, extraction of green tea leaves under ordinary pressure and fine filtration of this to obtain an ordinary pressure-extraction liquid (step b), and a mixing step of the pressure-extraction liquid and the ordinary pressure-extraction liquid obtained in each step in a mixing ratio that is determined on the basis of the weight of the raw tea leaves (step C).

Patent Document 9 discloses a method of manufacturing a green tea beverage that appropriately has unique green tea odor, delicious taste and richness taste, presents light greenish yellow of the color tone, and is translucent having no sediments even with long period storage, which comprises extracting a green tea with warm water at pH 8.0 to 10.0, and adjusting the extraction liquid to have pH 5.5 to 7.0 and 83 to 93% of turbidity as T % at 660 nm, respectively and then filling it into a package container and tight-sealing the package container.

In addition, Patent Document 10 discloses a method of manufacturing a tea beverage that is excellent in flavor, particularly excellent in nutritious taste, which comprises (i) a step of bringing tea leaves into contact with saturated steam, to promote opening of the tea leaves in the low temperature extraction step, (ii) a step of extracting the above-treated tea leaves with low temperature water, to obtain an extraction liquid, and (iii) a step of subjecting the above-mentioned extraction liquid to sterilization treatment.

Patent Documents 11 and 12 disclose a beverage packed in a container of which astringent taste and bitter taste are suppressed, which is obtained by blending a green tea extract containing high concentration of catechins with hydrocarbon in a suitable ratio.

PRIOR ART DOCUMENT

Patent Document

Patent Document 1: Japanese Patent Application Laid-Open (JP-A) No. 4-228028
Patent Document 2: JP-A No. H6-303904
Patent Document 3: JP-A No. H6-343389
Patent Document 4: JP-A No. H8-126472
Patent Document 5: JP-A No. H11-56242
Patent Document 6: JP-A No. H11-262359
Patent Document 7: JP-A No. 2001-258477
Patent Document 8: JP-A No. 2001-286260
Patent Document 9: JP-A No. 2005-130734
Patent Document 10: JP-A No. 2007-117006
Patent Document 11: Japanese Patent No. 3590051
Patent Document 12: Japanese Patent No. 4136922

DISCLOSURE OF THE INVENTION

Problems to be Solved by the Invention

Along with popularization of a green tea beverage, particularly a green tea beverage packed in a container, consumer taste and drinking situations have also become diversified, and a characteristic green tea beverage packed in a container that has unique taste and odor is demanded.

In a green tea beverage, if richness or concentration feeling is strengthened, the odor note becomes weaker relatively, and particularly the odor is suppressed when the beverage is drunk in a cold state.

To resolve such problems, the present invention provides a new green tea beverage packed in a container, which has spreading odor in the mouth, afterglow of odor, and yet has richness and/or concentration feeling in the taste and has odor note even in a cold state.

Means for Solving the Problems

The green tea beverage packed in a container of the present invention is characterized in that the concentration of saccharides, which is the sum of the concentration of monosaccharides and the concentration of disaccharides, is 150 ppm to 500 ppm, the ratio of the concentration of disaccharides relative to the concentration of monosaccharides (disaccharides/monosaccharides) is 2.0 to 8.0, the ratio of the concentration of electron-localized catechins relative to the above-mentioned concentration of saccharides (electron-localized catechins/saccharides) is 1.8 to 4.0, and the content ratio of furfural relative to geraniol (furfural/geraniol) is 0.5 to 3.0.

The green tea beverage packed in a container of the present invention makes it possible to obtain a new green tea beverage packed in a container that has spreading odor in the mouth, afterglow of odor, and yet has richness and/or concentration feeling in the taste and has odor note even in a cold state, by adjustment of the concentration of saccharides, which is the sum of the concentration of monosaccharides and the concentration of disaccharides, the ratio of the concentration of disaccharides relative to the concentration of monosaccharides, the concentration ratio of the concentration of electron-localized catechins relative to the concentration of saccharides and the content ratio of furfural relative to geraniol.

Mode for Carrying out the Invention

Hereinafter, one illustrative embodiment of the green tea beverage packed in a container of the present invention will be explained. However, the present invention is not limited to this illustrative embodiment.

The present green tea beverage packed in a container is a beverage obtained by filling a liquid containing an extraction liquid or an extract that is obtained by extraction of a green tea as a major component, into a container. The liquid includes, for example, a liquid that comprises only an extraction liquid that is obtained by extraction of a green tea, or a liquid obtained by dilution of the extraction liquid, or a liquid obtained by mixing of the tea extraction liquids with each other, or a liquid obtained by addition of an additive to any of the above-mentioned liquids, or a liquid obtained by dispersion of those dried of any of the above-mentioned liquids and the like.

The "major component" encompasses a meaning that containing of other components is acceptable within a range of not impeding the functions of the major component. At this time, the content ratio of the major component is not specified, but an extraction liquid or an extract that is obtained by extraction of a green tea, preferably takes up 50% or more by mass, particularly 70% or more by mass, and particularly 80% or more by mass (including 100%) in the solid content concentration in the beverage.

In addition, the kind of green tea is not particularly limited. For example, the kind of green tea includes broadly teas that are classified as a non-fermented tea such as a steamed tea, a decocted tea, a refined green tea, a green powdered tea, a Bancha tea, a bead green tea, an oven-roasted tea, a Chinese green tea and the like, and also encompasses a blend thereof in 2 or more kinds. In addition, cereals such as a brown rice, a flavor such as jasmine and the like may be also added thereto.

One illustrative embodiment of the green tea beverage packed in a container of the present invention (referred to as the "present green tea beverage packed in a container") is characterized in that the concentration of saccharides, which is the sum of the concentration of monosaccharides and the concentration of disaccharides, is 150 ppm to 500 ppm, the ratio of the concentration of disaccharides relative to the concentration of monosaccharides (disaccharides/monosaccharides) is 2.0 to 8.0, the ratio of the concentration of electron-localized catechins relative to the above-mentioned concentration of saccharides (electron-localized catechins/saccharides) is 1.8 to 4.0, and the content ratio of furfural relative to geraniol (furfural/geraniol) is 0.5 to 3.0.

A monosaccharide is a hydrocarbon represented by a general formula $C_6(H_2O)_6$, and is not hydrolyzed anymore to further simply saccharide. The monosaccharide referred to in the present invention represents glucose or fructose.

A disaccharide is a hydrocarbon represented by a general formula $C_{12}(H_2O)_{11}$, and is hydrolyzed to give a monosaccharide. The disaccharide referred to in the present invention represents sucrose, cellobiose or maltose.

When the concentration of saccharides which is the sum of monosaccharides and disaccharides (hereinafter, referred to as the concentration of saccharides.), is 150 ppm to 500 ppm, it allows a beverage that has a balance of the taste and the odor being maintained, and has sweet taste and richness, and has small bitter astringent taste and coarse taste, etc. in the aftertaste even when the present green tea beverage is drunk after a long storage at normal temperature, or in a cold state.

From such viewpoint, the concentration of saccharides is preferably 180 ppm to 235 ppm.

In adjustment of the concentration of saccharides to the above-described range, dry (fire) process or extraction of the tea leaves may be adjusted to suitable conditions. For example, if the dry (fire) process of the tea leaves is performed strongly, the saccharides are decomposed and decrease. In addition, if the tea leaves are extracted at high temperature for a long time, the saccharides are decomposed and decrease. Therefore, the concentration of saccharides may be adjusted by the dry (fire) conditions and the extraction conditions of the tea leaves.

At this time, although the adjustment may be performed by addition of saccharides, this has a fear of collapsing the balance of the green tea beverage, so the adjustment is preferably not by addition of saccharides, but by adjustment of conditions for obtaining a tea extraction liquid, and in addition, by mixing of the tea extraction liquids with each other, by addition of a tea extract, or the like.

In addition, when the ratio of the concentration of disaccharides relative to the concentration of monosaccharides (disaccharides/monosaccharides) is 2.0 to 8.0, it allows sweet taste of fire odor and proper concentration feeling when the green tea beverage is put into the mouth.

From such viewpoint, the ratio of the concentration of disaccharides relative to the concentration of monosaccharides (disaccharides/monosaccharides) is preferably 2.5 to 7.0, particularly preferably 2.7 to 6.0.

In adjustment of the ratio of the concentration of disaccharides relative to the concentration of monosaccharides to the above-described range, dry (fire) process or extraction of the tea leaves may be adjusted to suitable conditions. For example, if the dry (fire) process is performed to tea leaves, monosaccharides decrease first, and then disaccharides decrease. Therefore, with dry (fire) process to tea leaves, and extraction at low temperature for a long time, the ratio of disaccharides/monosaccharides can be lowered.

At this time, although the adjustment may be performed by addition of saccharides, this has a fear of collapsing the balance of the green tea beverage, so the adjustment is preferably performed not by addition of saccharides, but by adjustment of conditions for obtaining a tea extraction liquid, and in addition, by mixing of the tea extraction liquids with each other, by addition of a tea extract, or the like.

The concentration of total catechins in the present green tea beverage packed in a container is preferably 300 ppm to 920 ppm.

The concentration of total catechins is particularly more preferably 350 ppm to 850 ppm, and particularly further preferably 400 ppm to 850 ppm.

At this time, total catechins mean total 8 kinds of catechin (C), gallocatechin (GC), catechin gallate (Cg), gallocatechin gallate (GCg), epicatechin (EC), epigallocatechin (EGC), epicatechin gallate (ECg), and epigallocatechin gallate (EGCg), and the concentration of total catechins mean total values of the concentrations of the 8 kind catechins.

In adjustment of the concentration of total catechins to the above-described range, the concentration of the total catechins may be adjusted by extraction conditions. At this time, although the adjustment may be performed by addition of catechins, this has a fear of collapsing the balance of the green tea beverage. Therefore, the adjustment is preferably performed by adjustment of conditions for obtaining a tea extraction liquid, and in addition, by mixing of the tea extraction liquids with each other, by addition of a tea extract, or the like.

The concentration of electron-localized catechins in the present green tea beverage packed in a container is preferably 260 ppm to 810 ppm.

The concentration of electron-localized catechins is particularly more preferably 305 ppm to 750 ppm.

The "electron-localized catechin" referred to in the present invention is a catechin that has a triol structure (a structure having 3 OH groups adjacent to the benzene ring), and is considered to be likely to have localization of the electric charge when ionized. Specifically, the "electron-localized catechin" includes epigallocatechin gallate (EGCg), epigallocatechin (EGC), epicatechin gallate (ECg), gallocatechin gallate (GCg), gallocatechin (GC), catechin gallate (Cg), and the like.

In adjustment of the concentration of the electron-localized catechins to the above-described range, the concentration of the electron-localized catechins may be adjusted with the extraction conditions. However, the concentration of the electron-localized catechins easily changes with the extraction time and the temperature, and thus if the temperature is too high, or the extraction time is too long, it is not preferable also in view of holding the aroma of the beverage. At this time, although the adjustment may be performed by addition of the electron-localized catechins, this has a fear of collapsing the balance of the green tea beverage, so the adjustment is preferably performed by adjustment of conditions for obtaining a tea extraction liquid, and in addition, by mixing of the tea extraction liquids with each other, by addition of a tea extract, or the like.

The ratio of the concentration of electron-localized catechins relative to the concentration of saccharides (electron-localized catechins/saccharides) in the present green tea beverage packed in a container is preferably 1.8 to 4.0. If the ratio is within this range, the present green tea beverage packed in a container becomes a beverage that has a balance of the astringent taste and the sweet taste, and has the richness and the concentration feeling in the taste, and has deep delicious taste.

The ratio of the concentration of electron-localized catechins relative to the concentration of saccharides (electron-localized catechins/saccharides) is particularly preferably 1.8 to 3.8, and further preferably 1.8 to 3.5.

In adjustment of the ratio of the concentration of electron-localized catechins relative to the concentration of saccharides to the above-described range, the ratio may be adjusted with the extraction conditions. However, although the extraction rate of catechins increases at high temperature, saccharides are likely to be decomposed, and thus the extraction time is preferably short. At this time, although the adjustment may be performed by addition of the electron-localized catechins and the saccharides, this has a fear of collapsing the balance of the green tea beverage, so the adjustment is preferably performed by adjustment of conditions for obtaining a tea extraction liquid, and in addition, by mixing of the tea extraction liquids with each other, by addition of a tea extract, or the like.

In the present green tea beverage packed in container, the ratio of the concentration of saccharides relative to the concentration of theanine (saccharides/theanine) is preferably 10 ppm to 50 ppm.

The theanine is a derivative of glutamic acid contained in a green tea or the like, and includes, for example, L- or D-glutamic acid-γ-alkyl amide such as L-glutamic acid-γ-ethyl amide (L-theanine), L-glutamic acid-γ-methyl amide, D-glutamic acid-γ-ethyl amide (D-theanine) and D-glutamic acid-γ-methyl amide, a derivative containing the L- or D-glutamic acid-γ-alkyl amide in the basic structure (for example, glycoside of L- or D-glutamic acid-γ-alkyl amide and the like), and the like.

In adjustment of the ratio of the concentration of saccharides relative to the concentration of theanine to the above-described range, the ratio may be adjusted with strong dry conditions for raw materials. At this time, although the adjustment may be performed by addition of saccharides and theanine, this has a fear of collapsing the balance of the green tea beverage, so the adjustment is preferably performed by adjustment of conditions for obtaining a tea extraction liquid, and in addition, by mixing of the tea extraction liquids with each other, by addition of a tea extract, or the like.

The concentration of caffeine in the present green tea beverage packed in a container is preferably 90 ppm to 300 ppm.

The concentration of caffeine is more particularly preferably 100 ppm to 290 ppm, and particularly further preferably 110 ppm to 270 ppm.

In adjustment of the concentration of caffeine to the above-described range, the concentration of caffeine may be adjusted with the amount of tea leaves and extraction temperature. At this time, although the adjustment may be performed by addition of caffeine, this has a fear of collapsing the balance of the green tea beverage, so the adjustment is preferably performed by adjusting conditions for obtaining a tea extraction liquid, and in addition, by mixing of the tea extraction liquids with each other, by addition of a tea extract, or the like.

In addition, in the present green tea beverage packed in a container, the ratio of the concentration of total catechins relative to the concentration of caffeine (total catechins/caffeine) is preferably 2.5 to 4.5.

The ratio of the concentration of total catechins relative to the concentration of caffeine is more preferably 2.7 to 4.5, particularly further preferably 3.0 to 4.0.

In adjustment of the ratio of the concentration of total catechins relative to the concentration of caffeine to the above-described range, the adjustment may be performed by adjusting the amount of tea leaves and extraction temperature. At this time, although the adjustment may be performed by addition of total catechins and caffeine, this has a fear of collapsing the balance of a green tea beverage, so the adjustment is preferably performed by adjusting conditions for obtaining a tea extraction liquid, and in addition, by mixing of the tea extraction liquids with each other, by addition of a tea extract, or the like.

The concentration of the soluble solid content derived from tea leaves in the present green tea beverage packed in a container is preferably 0.20% to 0.40%. The soluble solid content derived from tea leaves is a sucrose-converted value of the soluble solid content obtained from extraction of the green tea.

The soluble solid content derived from tea leaves in the present green tea beverage packed in a container is more preferably 0.22% to 0.38%, and particularly further preferably 0.25% to 0.35%.

In adjustment of the soluble solid content derived from tea leaves to the above-described range, the adjustment may be performed by suitably adjusting the amount of tea leaves and extraction conditions.

The ratio of the concentration of saccharides relative to the concentration of the soluble solid content derived from tea leaves (saccharides/(soluble solid content derived from tea leaves×100)) in the present green tea beverage packed in a container is preferably 5.0 to 10.0. If the ratio is within this range, the present green tea beverage packed in a container becomes a beverage that has proper richness or concentration feeling relative to astringent taste or the like in the taste, and has deep delicious taste with odor and balance.

From such viewpoint, the ratio of the concentration of saccharides relative to the concentration of the soluble solid content derived from tea leaves is more preferably 5.2 to 9.0, and particularly further preferably 6.5 to 8.5.

In adjustment of the ratio of the concentration of saccharides relative to the concentration of the soluble solid content derived from tea leaves to the above-described range, the concentration of the solid content may be elevated by increasing the amount of tea leaves, and the ratio may be adjusted by combination with drying conditions for the raw tea. At this time, although the adjustment may be performed by addition of the saccharides, this has a fear of collapsing the balance of the green tea beverage, so the adjustment is preferably performed by adjusting conditions for obtaining a tea extraction liquid, and in addition, by mixing of the tea extraction liquids with each other, by addition of a tea extract, or the like.

The ratio of the concentration of electron-localized catechins relative to the concentration of the soluble solid content derived from tea leaves (electron-localized catechins/(soluble solid content derived from tea leaves×100)) in the present green tea beverage packed in a container is preferably 15.0 to 20.0. When such ratio is within this range, the present green tea beverage packed in a container becomes a beverage that appropriately has the concentration feeling by the astringent taste to the sweet taste or the like, and has a balance of odor afterglow and the concentration feeling of the taste, and further is also temporally stable in the characteristics.

From such viewpoint, the ratio of the concentration of electron-localized catechins relative to the concentration of the soluble solid content derived from tea leaves is more preferably 15.0 to 19.5.

In adjustment of the ratio of the concentration of electron-localized catechins relative to the concentration of the soluble solid content derived from the tea leaves to the above-described range, the adjustment may be performed with extraction conditions or the like since the dissolution properties of catechins at the extraction temperature are different to each other. At this time, although the adjustment may be performed by addition of the saccharides, this has a fear of collapsing the balance of the green tea beverage, so the adjustment is preferably performed by adjustment of conditions for obtaining a tea extraction liquid, and in addition, by mixing of the tea extraction liquids with each other, by addition of a tea extract, or the like.

The ratio of the concentration of total catechins relative to the concentration of the soluble solid content derived from tea leaves (total catechins/(soluble solid content derived from tea leaves×100)) in the present green tea beverage packed in a container is preferably 18.0 to 22.0.

The ratio of the concentration of total catechins relative to the concentration of the soluble solid content derived from tea leaves is more preferably 18.5 to 21.5, and particularly further preferably 18.8 to 20.0.

In adjustment of the ratio of the concentration of total catechins relative to the concentration of the soluble solid content derived from tea leaves to the above-described range, the adjustment may be performed with the dry conditions and the extraction conditions of the tea leaves.

At this time, although the adjustment may be performed by addition of the catechins, this has a fear of collapsing the balance of the green tea beverage, so the adjustment is preferably performed by adjustment of conditions for obtaining a tea extraction liquid, and in addition, by mixing of the tea extraction liquids with each other, by addition of a tea extract, or the like.

The content ratio of furfural relative to geraniol (furfural/geraniol) in the present green tea beverage packed in a container is preferably 0.5 to 3.0. When the content ratio is within this range, the present green tea beverage packed in a container becomes a beverage that has a balance of spreading fire odor, and bluish afterglow of deep odor when the green tea beverage is put into the mouth, and has odor of deep taste.

From such viewpoint, the content ratio of furfural relative to geraniol (furfural/geraniol) is particularly preferably 0.6 to 2.9, and further preferably 0.8 to 2.6.

In adjustment the content ratio of furfural relative to geraniol to the above-described range, the conditions for the dry (fire) process for the tea leaves may be adjusted to suitable conditions. For example, if the dry (fire) process for the tea leaves is performed at low temperature, the content ratio may decrease, and if the dry (fire) process for the tea leaves is performed at high temperature, the content ratio may increase.

At this time, although the adjustment may be performed by addition of aroma chemicals or the like containing furfural and geraniol, this has a fear of collapsing the balance of the green tea beverage, so the adjustment is preferably performed by adjustment of conditions for obtaining a tea extraction liquid, and in addition, by mixing of the tea extraction liquids with each other, by addition of a tea extract, or the like.

The pH of the present green tea beverage packed in a container is preferably 6.0 to 6.5 at 20° C. The pH of the present green tea beverage packed in a container is more preferably 6.0 to 6.4, and particularly further preferably 6.1 to 6.3.

The concentrations of monosaccharides, disaccharides, total catechins, electron-localized catechins, caffeine and theanine described above can be measured by a calibration curve method and the like using a high performance liquid chromatogram (HPLC) or the like.

In addition, the content ratio of furfural relative to geraniol can be measured with SPME method (a solid phase microextraction method) or the like.

(Container)

A container to be filled with the present green tea beverage packed in a container is not particularly limited. For example, a plastic-made bottle (so-called PET bottle), a can of a metal such as steel and aluminum, a bottle, a paper container and the like may be used, and particularly, a transparent container such as a PET bottle and the like may be preferably used as the container.

(Manufacturing Method)

The present green tea beverage packed in a container may be manufactured by, for example, selecting raw materials for tea leaves, and suitably adjusting conditions for a dry (fire) process and extraction for the tea leaves, whereby to adjust the concentration of saccharides, which is the sum of the concentration of monosaccharides and the concentration of disaccharides, to 150 ppm to 500 ppm, the ratio of the concentration of disaccharides relative to the concentration of monosaccharides (disaccharides/monosaccharides) to 2.0 to 8.0, the ratio of the concentration of electron-localized catechins relative to the concentration of saccharides (electron-localized catechins/saccharides) to 1.8 to 4.0, and the content ratio of furfural relative to geraniol (furfural/geraniol) to 0.5 to 3.0 in the beverage.

For example, the present green tea beverage packed in a container can be manufactured by preparing an extraction liquid, which is obtained by subjecting tea leaves to a dry (fire) process at 220° C. to 260° C. and extracting the tea leaves at high temperature for a short time, and a conventional general green tea extraction liquid, i.e., an extraction liquid that is obtained by subjecting tea leaves to a dry (fire) process at 80° C. to 150° C. and extracting the tea leaves at low temperature for a long time, and then blending them in a suitable ratio. However, the invention is not limited to such manufacturing method.

As described above, by performing the dry process to tea leaves, first, the monosaccharides decrease, and then the disaccharides decrease. Accordingly, by adjusting the conditions for the dry process, the concentration of saccharides and the value of the disaccharides/monosaccharides may be adjusted.

(Explanation for Terms)

The "green tea beverage" in the present invention means a beverage containing a tea extraction liquid or tea extract that is obtained from tea extraction, as a major component.

In addition, the "green tea beverage packed in a container" means a green tea beverage that is packed in a container, and also means a green tea beverage that may be provided for drinking without dilution.

When "X to Y" (X and Y are any number) is expressed in the present specification, it encompasses the meaning of "X or more and Y or less", and also the meaning of "preferably greater than X" and "preferably less than Y" unless otherwise stated.

EXAMPLES

Hereinafter, Examples of the present invention will be explained. However, the present invention is not limited to this Example.

The "concentration of monosaccharides" in Examples means a total concentration of glucose and fructose, and the "concentration of disaccharides" means a total concentration of sucrose, cellobiose and maltose.

<Evaluation Test 1>

Extraction Liquids A to D described below were prepared, and using these extraction liquids, green tea beverages of Examples 1 to 4 and Comparative Examples 1 to 5 were prepared, and sensory evaluations therefor were performed.

(Extraction Liquid A)

Tea leaves (Yabukita species, first flush tea produced in Shizuoka Prefecture) after plucking were subjected to Aracha process, and subjected to a dry process (fire process) with a rotation drum type drying machine under the conditions of 90° C. of the setting temperature and 30 minutes of the dry time. The tea leaves were extracted under the conditions of 10 g of the tea leaves, 1 L of 55° C. hot water and 8 minutes of the extraction time. This extraction liquid was filtered with a stainless mesh (20 mesh) to remove the tea grounds, and then further filtered with a stainless mesh (80 mesh). The filtrate was centrifugally isolated with use of SA1 continuous centrifugal isolator (manufactured by Westphalia) under the conditions of 300 L/h of the flow rate, 10000 rpm of the rotation number, and 1000 m² of the centrifugal sedimentation liquid area ($\Sigma$), to prepare Extraction Liquid A.

(Extraction Liquid B)

Tea leaves (Yabukita species, first flush tea produced in Shizuoka Prefecture) after plucking were subjected to Aracha process, and subjected to a dry process (fire process) with a rotation drum type drying machine under the conditions of 150° C. of the setting temperature and 22 minutes of the dry time. The tea leaves were extracted under the conditions of 8 g of the tea leaves, 1 L of 90° C. hot water and 6 minutes of the extraction time. This extraction liquid was filtered with a stainless mesh (20 mesh) to remove the tea grounds, and then further filtered with a stainless mesh (80 mesh). The filtrate was centrifugally isolated with use of SA1 continuous centrifugal isolator (manufactured by Westphalia) under the conditions of 300 L/h of the flow rate, 10000 rpm of the rotation number, and 1000 m² of the centrifugal sedimentation liquid area (E), to prepare Extraction Liquid B.

(Extraction Liquid C)

Tea leaves (Yabukita species, first flush tea produced in Shizuoka Prefecture) after plucking were subjected to Aracha process, and subjected to a dry process (fire process) with a rotation drum type drying machine under the conditions of 260° C. of the setting temperature and 15 minutes of the dry time. The tea leaves were extracted under the conditions of 6 g of the tea leaves, 1 L of 90° C. hot water and 6 minutes of the extraction time. This extraction liquid was filtered with a stainless mesh (20 mesh) to remove the tea grounds, and then further filtered with a stainless mesh (80 mesh). The filtrate was centrifugally isolated with use of SA1 continuous centrifugal isolator (manufactured by Westphalia) under the conditions of 300 L/h of the flow rate, 10000 rpm of the rotation number, and 1000 of the centrifugal sedimentation liquid area ($\Sigma$), to prepare Extraction Liquid C.

(Extraction Liquid D)

Tea leaves (Yabukita species, first flush tea produced in Shizuoka Prefecture) after plucking were subjected to Aracha process, and subjected to a dry process (fire process) with a rotation drum type drying machine under the conditions of 220° C. of the setting temperature, and 15 minutes of the dry time. The tea leaves were extracted under the conditions of 11 g of the tea leaves, 1 L of 90° C. hot water and 3.5 minutes of the extraction time. This extraction liquid was filtered with a stainless mesh (20 mesh) to remove the tea grounds, and then further filtered with a stainless mesh (80 mesh). The filtrate was centrifugally isolated with use of SA1 continuous centrifugal isolator (manufactured by Westphalia) under the conditions of 300 L/h of the flow rate, 10000 rpm of the rotation number, and 1000 of the centrifugal sedimentation liquid area ($\Sigma$), to prepare Extraction Liquid D.

(Analysis of Extraction Liquids)

1/10 amount of each extraction liquid described above was weighed, added with ascorbic acid in 400 ppm, and then added with sodium bicarbonate to adjust pH to 6.2, and added with ion-exchanged water to adjust the total amount to 100 mL. This liquid was filled into a heat-resistant transparent container (bottle) and capped, and over-turn sterilized for 30 seconds. The sterilization was performed to 9 or more of $F_0$ value for retort sterilization (121° C., 9 minutes), and the solution was immediately cooled to 20° C. and measured for analysis of the components of each extraction liquid.

The results of the analyses are shown in Table 1 described below. The measurement method is as described below.

TABLE 1

| | Disaccharides/ Monosaccharides | Concentration of saccharides (ppm) | Electron-localized catechins (ppm) | Furfural/ geraniol | Conditions for drying | Extraction temperature | Extraction time (Minute) | Amount of tea leaves used (g/L) | Soluble solid content derived from tea leaves (%) |
|---|---|---|---|---|---|---|---|---|---|
| A | 1.94 | 254.6 | 442.3 | 0.43 | 90° C. of firing for 30 Minutes | 55 | 8 | 10 | 0.29 |
| B | 9.13 | 135.6 | 549.2 | 3.90 | 150° C. of firing for 22 Minutes | 90 | 6 | 8 | 0.30 |
| C | 9.40 | 153.4 | 312.1 | 4.25 | 260° C. of firing for 15 Minutes | 90 | 6 | 6 | 0.22 |
| D | 2.80 | 225.8 | 774.1 | 0.80 | 220° C. of firing for 15 Minutes | 90 | 3.5 | 11 | 0.41 |

(Blending)

Extraction Liquids A to D were blended in the ratios shown in Table 2 described below. Furthermore, Extraction Liquids A to D were suitably adjusted with an extraction extract containing geraniol and furfural, and added with ascorbic acid in 400 ppm, and then added with sodium bicarbonate to adjust pH to 6.2, and added with ion-exchanged water to adjust the total amount to 1000 mL. This liquid was filled into a heat-resistant transparent container (bottle) and capped, and over-turn sterilized for 30 seconds. The sterilization was performed to 9 or more of $F_0$ value for retort sterilization (121° C., 9 minutes), and the solution was immediately cooled to 20° C., to prepare the green tea beverages of Examples 1 to 4 and Comparative Examples 1 to 5.

TABLE 2

| | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|
| A | 70 | 0 | 0 | 0 | 100 | 0 | 0 | 0 | 0 |
| B | 0 | 0 | 60 | 0 | 0 | 100 | 0 | 60 | 0 |
| C | 30 | 50 | 0 | 0 | 0 | 0 | 100 | 0 | 0 |
| D | 0 | 50 | 40 | 100 | 0 | 0 | 0 | 40 | 100 |
| Total ratio | 100 | 100 | 100 | 100 | 100 | 100 | 100 | 100 | 100 |

TABLE 3

| | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|
| Concentration Of Saccharides (ppm) | 224.2 | 189.6 | 171.7 | 225.8 | 254.6 | 135.6 | 153.4 | 171.7 | 225.8 |
| Disaccharides/Mono-saccharides | 4.18 | 6.10 | 6.60 | 2.80 | 1.94 | 9.13 | 9.40 | 6.60 | 2.80 |
| Electron-Localized Catechins/Saccharides | 1.80 | 2.86 | 3.72 | 3.43 | 1.74 | 4.05 | 2.03 | 3.72 | 3.43 |
| Electron-Localized Catechins (ppm) | 403.2 | 543.1 | 639.1 | 774.1 | 442.3 | 549.2 | 312.1 | 639.1 | 774.1 |
| Caffeine (ppm) | 161.8 | 178.3 | 193.6 | 219.3 | 172.3 | 176.4 | 137.3 | 193.6 | 219.3 |
| Furfural/Geraniol | 1.58 | 2.53 | 2.66 | 0.80 | 0.43 | 3.90 | 4.25 | 3.10 | 0.47 |
| pH | 6.2 | 6.2 | 6.2 | 6.2 | 6.2 | 6.2 | 6.2 | 6.2 | 6.2 |
| Electron-Localized Catechins/(Soluble Solid Content Derived From Tea Leaves × 100) | 15.51 | 16.97 | 18.80 | 18.88 | 15.25 | 18.31 | 14.19 | 18.80 | 18.88 |
| Total Catechins (ppm) | 450.9 | 610.8 | 719.6 | 873.4 | 494.9 | 617.1 | 348.2 | 719.6 | 873.4 |
| Soluble Solid Content Derived From Tea Leaves (%) | 0.26 | 0.32 | 0.34 | 0.41 | 0.29 | 0.30 | 0.22 | 0.34 | 0.41 |

TABLE 3-continued

| | | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|---|
| Brix (%) | | 0.32 | 0.38 | 0.39 | 0.47 | 0.33 | 0.34 | 0.28 | 0.39 | 0.47 |
| Total Catechins/Caffeine | | 2.79 | 3.43 | 3.72 | 3.98 | 2.87 | 3.50 | 2.54 | 3.72 | 3.98 |
| Saccharides/(Soluble Solid Content Derived From Tea Leaves × 100) | | 8.62 | 5.93 | 5.05 | 5.51 | 8.78 | 4.52 | 6.97 | 5.05 | 5.51 |
| Odor | Top note | ○ | ◎ | ○ | ○ | X | ◎ | ◎ | ◎ | X |
| | Middle note | ◎ | ◎ | ○ | ◎ | ◎ | X | △ | X | ◎ |
| | Bottom note | ◎ | ◎ | ○ | ○ | ○ | ○ | X | ○ | △ |
| Taste | Deliciousness (richness) | ○ | ◎ | ◎ | ◎ | △ | △ | △ | △ | △ |
| | Preference (Balance of astringent taste) | ○ | ◎ | ○ | ○ | X | X | △ | X | X |
| Turbidity | | − | − | ± | ± | + | ± | ± | ± | ± |
| Total Evaluation | | ○ | ◎ | ○ | ◎ | X | △ | △ | △ | △ |

(Analysis)

Components and pH of the green tea beverages of Examples 1 to 4 and Comparative Examples 1 to 5 were measured as shown below. The results are shown in Table 3 described above.

The concentration of monosaccharides and the concentration of disaccharides were quantity-measured by a calibration curve method with manipulation of a HPLC saccharide analysis equipment (manufactured by Dionex Corporation) under the conditions described below.

Column: "Carbopack PA1 φ4.6×250 mm" manufactured by Dionex Corporation
Column Temperature: 30° C.
Mobile Phase:

| Phase A | 200 mM NaOH |
| Phase B | 1000 mM Sodium Acetate |
| Phase C | Ultrapure water |

Flow Rate: 1.0 mL/min
Injection Amount: 50 µL
Detection: "ED50 gold electrode" manufactured by Dionex Corporation The concentration of electron-localized catechin, the concentration of total catechin and the concentration of caffeine were quantity-measured by a calibration curve method with manipulation of a high performance liquid chromatogram (HPLC) under the conditions described below.

Column: "Xbridge shield RP18 φ3.5×150 mm" manufactured by Waters Corporation
Column Temperature: 40° C.
Mobile Phase:

| Phase A | Water |
| Phase B | Acetonitrile |
| Phase C | 1% phosphoric acid |

Flow Rate: 0.5 mL/min
Injection Amount: 5 µL
Detection: "UV230 nm UV detector" manufactured by Waters Corporation To a vial container were added 10 mL of the sample, 3 g of NaCl, and 5 µL of 0.1% cyclohexanol as an internal index, and the vial container was sealed, and then warmed to 60° C. and extracted with SPME method solid phase micro-extraction method) for 30 minutes, and the values of geraniol and furfural were measured using the equipment described below.

From the MS spectrum obtained, the characteristic peaks were selected and the content ratio of furfural relative to geraniol was calculated from the area value.

SPME fiber: "DVB/carboxen/PDMS" manufactured by Supelco
GC-MS system
Equipment: 5973N manufactured by Agilent
Column: "DB-WAX, 60 m×0.25 mm×0.25 µm" manufactured by Agilent
Column oven: 35 to 240° C., 6° C./min The pH was measured with "F-24", a pH meter manufactured by HORIBA, Ltd. according to an ordinary method.

The concentration of the soluble solid content (Brix) was measured with "DD-7" manufactured by ATAGO CO., LTD.

(Evaluation Item)

Using the green tea beverages of Examples 1 to 4 and Comparative Examples 1 to 5, odor (top note, middle note, bottom note), taste (deliciousness, preference (balance of astringent taste)) and turbidity were evaluated.

(Evaluation Test)

The green tea beverages of Examples 1 to 4 and Comparative Examples 1 to 5 (25° C. temperature) were visually observed first by 10 persons of trained examiners. Then, each beverage was tasted, and given scores by the standards as described below. The average points of the 10 persons were evaluated wherein "◎" indicates 3.5 or more, "o" indicates 3 or more and less than 3.5, "△" indicates 2 or more and less than 3, and "x" indicates 1 or more and less than 2. The results thereof are shown in Table 3 described above.

<Turbidity>
+: Turbidity, which does not disappear with light 2stirring
±: Slight turbidity recognized, which disappears with light stirring
−: No Turbidity
<Odor>
Particularly strong=4
Strong=3
Average=2
Weak=1
<Deliciousness (Richness)>
Strong richness=4
Some richness=3

Slight richness=2
Light=1
<Preference (Balance of Astringent Taste)>
Very favorite=4
Favorite=3
Average=2
Dislike=1
(Total Evaluation)

The average points of the evaluation tests for odor and taste were computed, and the total evaluations for the average points were performed wherein "⊚" indicates 3.5 or more, "o" indicates 3 or more and less than 3.5, "Δ" indicates 2 or more and less than 3, and "x" indicates 1 or more and less than 2.

For any of Examples 1 to 4, excellent results were obtained, of which the total evaluation was "o" or better.

On the other hand, for Comparative Examples 1 to 5, the results were not preferable, of which the evaluation was "Δ" for Comparative Examples 2 to 5 and "x" for Comparative Example 1.

From the results of Comparative Example 1, it was found that if the value of electron-localized catechins/saccharides decreases, the astringent taste becomes weaker, the deliciousness (richness) becomes deficient, and the preference becomes worse. From the results of Comparative Example 2, it was found that if the value of electron-localized catechins/saccharides increases, the astringent taste becomes strong, the aftertaste becomes worse, the middle note is also hardly sensed, and the preference becomes worse.

From the results of Comparative Example 1, it was found that if the value of disaccharides/monosaccharides decreases, the top note becomes weaker, and the fire odor does not spread, and the deliciousness (richness) is not sufficient in a cold state. From the results of Comparative Examples 2 and 3, it was found that if the value of disaccharides/monosaccharides increases, the fire odor becomes stronger, the odor note becomes stronger, and the balance of the top note, the middle note and the bottom note becomes worse, and the deliciousness (richness) is harmed.

From the results of Comparative Examples 1 and 5, it was found that if the value of furfural/geraniol decreases, the top note becomes weaker, the fresh odor is noticeable, the odor note becomes weaker, the odor through the nose is also weak, and particularly insufficiency in the mouth is sensed after cooled. From the results of Comparative Examples 2 to 4, it was found that if the value of furfural/geraniol increases, the odor note of fire odor is noticeable, the fresh odor is hardly sensed, the middle note becomes weaker, and the afterglow of deep odor is harmed, and deep deliciousness (richness) is harmed, and the preference becomes worse.

From these results, it is assumed that the ranges of the ratio of the concentration of disaccharides relative to the concentration of monosaccharides (disaccharides/monosaccharides) being 2.0 to 8.0, the ratio the concentration of electron-localized catechins relative to the concentration of saccharides (electron-localized catechins/saccharides) being 1.8 to 4.0, and the content ratio of furfural relative to geraniol (furfural/geraniol) being 0.5 to 3.0, are ranges that allow improvements of the odor (top note, middle note, bottom note), the taste (deliciousness (richness)), and the preference (balance of astringent taste)). It was discovered that a green tea beverage of which these items are in these ranges, has spreading odor in the mouth, afterglow of odor, and yet has deliciousness (richness) and/or concentration feeling, and can be drunk delectably even in a cold state.

<Evaluation Test 2>

Extraction Liquids E and F described below were prepared, and using these extraction liquids, the green tea beverages of Examples 5 to 9 were prepared and evaluations for the balance of flavor were performed by sensory evaluations.

(Extraction Liquid E)

Tea leaves (Yabukita species, first flush tea produced in Shizuoka Prefecture) after plucking were subjected to Aracha process, and subjected to a dry process (fire process) with a rotation drum type drying machine under the conditions of 220° C. of the setting temperature and 15 minutes of the dry time. The tea leaves were extracted under the conditions of 11 g of the tea leaves, 1 L of 90° C. hot water and 6 minutes of the extraction time. This extraction liquid was filtered with a stainless mesh (20 mesh) to remove the tea grounds, and then further filtered with a stainless mesh (80 mesh). The filtrate was centrifugally isolated with use of SA1 continuous centrifugal isolator (manufactured by Westphalia) under the conditions of 300 L/h of the flow rate, 10000 rpm of the rotation number, and 1000 m$^2$ of the centrifugal sedimentation liquid area (Σ), to prepare Extraction Liquid E.

(Extraction Liquid F)

Tea leaves (Yabukita species, first flush tea produced in Shizuoka Prefecture) after plucking were subjected to Aracha process, and subjected to a dry process (fire process) with a rotation drum type drying machine under the conditions of 250° C. of the setting temperature, and 15 minutes of the dry time. The tea leaves were extracted under the conditions of 10 g of the tea leaves, 1 L of 73° C. hot water, and 4 minutes of the extraction time. This extraction liquid was filtered with a stainless mesh (20 mesh) to remove the tea grounds, and then further filtered with a stainless mesh (80 mesh). The filtrate was centrifugally isolated with use of SA1 continuous centrifugal isolator (manufactured by Westphalia) under the conditions of 300 L/h of the flow rate, 10000 rpm of the rotation number, and 1000 m$^2$ of the centrifugal sedimentation liquid area (Σ), to prepare Extraction Liquid F.

(Analysis of Extraction Liquids)

$\frac{1}{10}$ amount of each of the extraction liquids E and F was weighed, added with ascorbic acid in 400 ppm, and then added with sodium bicarbonate to adjust pH to 6.2, and added with ion-exchanged water to adjust the total amount to 100 mL. This liquid was filled into a heat-resistant transparent container (bottle) and capped, and over-turn sterilized for 30 seconds. The sterilization was performed to 9 or more of $F_0$ value for retort sterilization (121° C., 9 minutes), and the solution was immediately cooled to 20° C. and measured for analysis of the components of each extraction liquid.

The results of the analyses are shown in Table 4 described below. The measurement method is as described above.

TABLE 4

| | Saccharides/ (Soluble Solid Content Derived From Tea Leaves × 100) | Concentration Of Saccharides (ppm) | Disaccharides/ Monosaccharides | Electron-Localized Catechins (ppm) | Conditions for drying | Amount of tea leaves used (g/L) | Extraction time (minute) | Extraction temperature (° C.) | Soluble Solid Content Derived From Tea Leaves (%) |
|---|---|---|---|---|---|---|---|---|---|
| E | 4.92 | 211.7 | 3.00 | 801.3 | 220° C. of firing for 15 Minutes | 11 | 6 | 90 | 0.43 |

TABLE 4-continued

|   | Saccharides/ (Soluble Solid Content Derived From Tea Leaves × 100) | Concentration Of Saccharides (ppm) | Disaccharides/ Monosaccharides | Electron-Localized Catechins (ppm) | Conditions for drying | Amount of tea leaves used (g/L) | Extraction time (minute) | Extraction temperature (° C.) | Soluble Solid Content Derived From Tea Leaves (%) |
|---|---|---|---|---|---|---|---|---|---|
| F | 10.57 | 253.6 | 7.30 | 485.3 | 250° C. of filing for 15 Minutes | 10 | 4 | 73 | 0.24 |

(Blending)

Extraction Liquids E and F were blended in the ratios shown in Table 5 described below, and added with ion-exchanged water to adjust the total amount to 1000 mL. This liquid was filled into a heat-resistant transparent container (bottle) and capped, and over-turn sterilized for 30 seconds. The sterilization was performed to 9 or more of $F_0$ value for retort sterilization (121° C., 9 minutes), and the solution was immediately cooled to 20° C., to prepare the green tea beverages of Examples 5 to 9. The results of the measurements for the components and pH of the green tea beverages of Examples 5 to 9 are shown in Table 6 described below. The components and pH were measured in the same manner as described above.

TABLE 5

|   | Example 5 | Example 6 | Example 7 | Example 8 | Example 9 |
|---|---|---|---|---|---|
| E | 75 | 50 | 35 | 100 | 0 |
| F | 25 | 50 | 65 | 0 | 100 |
| Total ratio | 100 | 100 | 100 | 100 | 100 |

TABLE 6

|   | Example 5 | Example 6 | Example 7 | Example 8 | Example 9 |
|---|---|---|---|---|---|
| Saccharides/(Soluble Solid Content Derived From Tea Leaves × 100) | 5.85 | 6.84 | 7.71 | 4.92 | 10.14 |
| Concentration Of Saccharides (ppm) | 222.2 | 232.7 | 238.9 | 211.7 | 253.6 |
| Disaccharides/Monosaccharides | 4.08 | 5.15 | 5.80 | 3.00 | 7.30 |
| Caffeine (ppm) | 203.9 | 186.5 | 176.1 | 221.3 | 151.7 |
| Furfural/Geraniol | 1.15 | 1.73 | 2.08 | 0.56 | 2.89 |
| Electron-Localized Catechins (ppm) | 722.3 | 643.3 | 595.9 | 801.3 | 485.3 |
| pH | 6.2 | 6.2 | 6.2 | 6.2 | 6.2 |
| Total Catechins (ppm) | 814.6 | 724.9 | 671.0 | 904.4 | 545.3 |
| Soluble Solid Content Derived From Tea Leaves (%) | 0.38 | 0.34 | 0.31 | 0.43 | 0.25 |
| Brix (%) | 0.44 | 0.39 | 0.36 | 0.49 | 0.29 |
| Balance of Flavor | ○ | ⊚ | ○ | Δ | Δ |
|   | Good balance of flavor, good clean taste, concentration feeling, and delicious taste | Good balance of flavor, concentration feeling, and delicious taste and good refreshing taste | Good balance of flavor, nutritious taste, concentration feeling, and delicious taste |   |   |
| Total Evaluation | ○ | ⊚ | ○ | Δ | Δ |

(Evaluation Item)

The green tea beverages of Examples 5 to 9 were evaluated for the balance of flavor.

(Evaluation Test)

The green tea beverages of Examples 5 to 9 (25° C. temperature) were tasted by 10 persons of trained examiners, and given scores by the standards as described below. The average points of the 10 persons were evaluated wherein "⊚" indicates 3.5 or more, "o" indicates 3 or more and less than 3.5, "Δ" indicates 2 or more and less than 3, and "x" indicates 1 or more and less than 2. The results thereof are shown in Table 6 described above.

<Balance of Flavor>

Particularly favorite=4

Favorite=3

Average=2

Dislike=1

(Total Evaluation)

For any of Examples 5 to 7, excellent results were obtained, of which the total evaluation was "o" or better.

On the other hand, for Examples 8 and 9, the evaluation was "Δ", which were somewhat worse than the results of Examples 5 to 7.

From the results of Example 8, it was found that if the value of saccharides/(soluble solid content derived from tea leaves× 100) decreases, the refreshing taste becomes stronger and the taste is too clean, and reversely the concentration feeling is deficient and the sensed taste is insufficient. From the results of Example 9, it was found that if the value of saccharides/ (soluble solid content derived from tea leaves×100) increases, the nutritious taste becomes strong and remains in the aftertaste, and the refreshing taste becomes weaker.

From these results, it is assumed that the range of saccharides/(soluble solid content derived from tea leaves×100) being 5.0 to 10.0, is a range that allows balance of flavor to become better. It was discovered that a green tea beverage of which these items are in these ranges, has spreading odor in the mouth, afterglow of odor, and yet has richness and/or concentration feeling in the taste, and can be drunk delectably even in a cold state.

<Evaluation Test 3>

Extraction Liquids G and H described below were prepared, and using these extraction liquids, the green tea beverages of Examples 10 to 14 were prepared and sensory evaluations with age were performed.

(Extraction Liquid G)

Tea leaves after plucking (Yabukita species, first flush tea produced in Shizuoka Prefecture) were subjected to Aracha process, and subjected to dry process (fire process) with a rotation drum type drying machine under the conditions of 260° C. of the setting temperature and 15 minutes of the dry time. The tea leaves were extracted under the conditions of 8 g of the tea leaves, 1 L of 80° C. hot water, and 5 minutes of the extraction time. This extraction liquid was filtered with a stainless mesh (20 mesh) to remove the tea grounds, and then further filtered with a stainless mesh (80 mesh). The filtrate was centrifugally isolated with use of SA1 continuous centrifugal isolator (manufactured by Westphalia) under the conditions of 300 L/h of the flow rate, 10000 rpm of the rotation number, and 1000 m² of the centrifugal sedimentation liquid area (Σ), to prepare Extraction Liquid G.

(Sample H)

Tea leaves after plucking (Yabukita species, first flush tea produced in Shizuoka Prefecture) were subjected to Aracha process, and subjected to dry process (fire process) with a rotation drum type drying machine under the conditions of 120° C. of the setting temperature and 30 minutes of the dry time. The tea leaves were extracted under the conditions of 11 g of the tea leaves, 1 L of 90° C. hot water, and 4 minutes of the extraction time. This extraction liquid was filtered with a stainless mesh (20 mesh) to remove the tea grounds, and then further filtered with a stainless mesh (80 mesh). The filtrate was centrifugally isolated with use of SA1 continuous centrifugal isolator (manufactured by Westphalia) under the conditions of 300 L/h of the flow rate, 10000 rpm of the rotation number, and 1000 m² of the centrifugal sedimentation liquid area (Σ), to prepare Extraction Liquid H.

(Analysis of Extraction Liquids)

1/10 amount of each of the extraction liquids G and H was weighed, added with ascorbic acid in 400 ppm, and then added with sodium bicarbonate to adjust pH to 6.2, and added with ion-exchanged water to adjust the total amount to 100 mL. This liquid was filled into a heat-resistant transparent container (bottle) and capped, and over-turn sterilized for 30 seconds. The sterilization was performed to 9 or more of $F_0$ value for retort sterilization (121° C., 9 minutes), and the solution was immediately cooled to 20° C. and measured for analysis of the components of each extraction liquid.

The results of the analyses are shown in Table 7 described below. The measurement method is as described above.

TABLE 7

| | Concentration Of Saccharides (ppm) | Disaccharides/ Monosaccharides | Electron-Localized Catechins (ppm) | Conditions for drying | Extraction temperature | Amount of tea leaves used (g/L) | Extraction time (minute) | Soluble Solid Content Derived From Tea Leaves (%) |
|---|---|---|---|---|---|---|---|---|
| G | 220.7 | 7.77 | 400.4 | 260 C. of firing for 15 Minutes | 80 | 8 | 5 | 0.27 |
| H | 318.6 | 2.41 | 786.1 | 120 C. of firing for 30 Minutes | 90 | 11 | 4 | 0.39 |

(Blending)

Extraction Liquids G and H were blended in the ratios shown in Table 8 described below, and added with ion-exchanged water to adjust the total amount to 1000 mL. This liquid was filled into a heat-resistant transparent container (bottle) and capped, and over-turn sterilized for 30 seconds. The sterilization was performed to 9 or more of $F_0$ value for retort sterilization (121° C., 9 minutes), and immediately cooled to 20° C., to prepare the green tea beverages of Examples 10 to 14. The results of the measurements for the components and pH of the green tea beverages of Examples 10 to 14 are shown in Table 9 described below. The components and pH were measured in the same manner as described above.

TABLE 8

| | Example 10 | Example 11 | Example 12 | Example 13 | Example 14 |
|---|---|---|---|---|---|
| G | 80 | 50 | 20 | 100 | 0 |
| H | 20 | 50 | 80 | 0 | 100 |
| Total ratio | 100 | 100 | 100 | 100 | 100 |

TABLE 9

| | Example 10 | Example 11 | Example 12 | Example 13 | Example 14 |
|---|---|---|---|---|---|
| Electron-Localized Catechins/(Soluble Solid Content Derived From Tea Leaves × 100) | 16.47 | 17.98 | 19.69 | 14.83 | 20.16 |
| Concentration Of Saccharides (ppm) | 240.3 | 269.7 | 299.0 | 220.7 | 318.6 |

TABLE 9-continued

|  |  |  | Example 10 | Example 11 | Example 12 | Example 13 | Example 14 |
|---|---|---|---|---|---|---|---|
| Disaccharides/Monosaccharides |  |  | 6.70 | 5.09 | 3.48 | 7.77 | 2.41 |
| Saccharides/(Soluble Solid Content Derived From Tea Leaves × 100) |  |  | 8.27 | 8.17 | 8.31 | 8.17 | 8.17 |
| Caffeine (ppm) |  |  | 161.2 | 180.1 | 198.9 | 148.6 | 211.5 |
| Furfural/Geraniol |  |  | 2.48 | 1.73 | 0.99 | 2.94 | 0.52 |
| Electron-Localized Catechins (ppm) |  |  | 477.5 | 593.3 | 709.0 | 400.4 | 786.1 |
| pH |  |  | 6.2 | 6.2 | 6.2 | 6.2 | 6.2 |
| Total Catechins (ppm) |  |  | 536.6 | 666.6 | 796.6 | 449.9 | 883.3 |
| Soluble Solid Content Derived From Tea Leaves (%) |  |  | 0.29 | 0.33 | 0.36 | 0.27 | 0.39 |
| Brix (%) |  |  | 0.35 | 0.38 | 0.42 | 0.33 | 0.44 |
| Change with age | Odor | Top note | ○ | ○ | Δ | ○ | Δ |
|  |  | Middle note | Δ | ○ | ○ | Δ | Δ |
|  |  | Bottom note | Δ | ○ | ○ | Δ | Δ |
|  | Taste | Deliciousness (richness/light) | Δ | ○ | ○ | ○ | ○ |
|  |  | Preference (favorite/dislike) | ○ | ○ | Δ | Δ | Δ |
|  | Balance of Flavor |  | Good balance of flavor, appropriate residual nutritious taste and sweet taste, and delicious and clean taste | Good balance of flavor, appropriate residual nutritious taste and sweet taste, and appropriate concentration feeling and clean taste | Good balance of flavor, nutritious taste and sweet taste and concentration feeling, and clean taste |  |  |
|  | With Age (Secondary sediments) |  | − | ± | ± | − | + |
| Total Evaluation |  |  | ○ | ○ | ○ | Δ | Δ |

(Evaluation Item)

The green tea beverages of Examples 10 to 14 were stored at 37° C. for one month, and the odor (top note, middle note, bottom note), the taste (deliciousness (richness/light), and the preference (favorite/dislike)), the balance of flavor and the secondary sediments were evaluated.

(Evaluation Test)

The green tea beverages of Examples 10 to 14 (25° C. temperature) were visually observed first for presence or absence of the secondary sediments by 10 persons of trained examiners. Then, each beverage was tasted, and given scores as described below by the evaluations. The evaluations for the average points of the ten persons were performed wherein "⊚" indicates 3.5 or more, "o" indicates 3 or more and less than 3.5, "Δ" indicates 2 or more and less than 3, and "x" indicates 1 or more and less than 2. The results thereof are shown in Table 9 described above.

<Secondary Sediments>
+: Sediments, which does not disappear with light stirring
±: Slight sediments recognized, which disappears with light stirring
−: No sediments <Odor>
Particularly strong=4
Strong=3
Average=2
Weak=1

<Deliciousness>
Strong richness=4
Some richness=3
Slight richness=2
Light=1

<Preference>
Very favorite=4
Favorite=3
Average=2
Dislike=1

<Balance of Flavor>
Particularly favorite=4
Favorite=3
Average=2
Dislike=1

(Total Evaluation)

The average points of the evaluation tests of the odor, the taste, and the balance of flavor were computed, and the total evaluations for the average points were performed wherein "⊚" indicates 3.5 or more, "o" indicates 3 or more and less than 3.5, "Δ" indicates 2 or more and less than 3, and "x" indicates 1 or more and less than 2.

For any of Examples 10 to 12, excellent results were obtained, of which the total evaluation was "o" or better.

On the other hand, for Examples 13 and 14, the evaluation was "Δ", which were somewhat worse than the results of Examples 10 to 12.

From the results of Example 13, it was found that if the value of electron-localized catechins/(soluble solid content derived from tea leaves×100) decreases, the astringent taste becomes weaker, the sweet taste remains, and cleanness becomes worse, and further, the middle note and the bottom note are also sensed weakly, and the balance of flavor is collapsed. From the results of Example 14, if the value of electron-localized catechins/(soluble solid content derived from tea leaves×100) increases, the astringent taste becomes stronger and remains in the aftertaste, and the whole odor becomes weaker, and the balance of flavor is also collapsed, and the cleanness becomes worse, and further, secondary sediments is generated.

From these results, it is assumed that the range of the electron-localized catechins/(soluble solid content derived from tea leaves×100) being 15.0 to 20.0, is a range that that allows no generation of secondary sediments even with age, and improvements in the odor, the taste, and the balance of flavor. It was discovered that a green tea beverage of which these items are in these ranges, has spreading odor in the mouth, afterglow of odor even with age, and yet has richness and/or concentration feeling in the taste, and can be drunk delectably even in a cold state, and gives no secondary sediments.

The invention claimed is:

1. A green tea beverage packed in a container, wherein:
   the green tea beverage has an extraction of green tea as its major component,
   a concentration of saccharides, which is a sum of a concentration of monosaccharides and a concentration of disaccharides, is 150 ppm to 500 ppm,
   a ratio of the concentration of disaccharides to the concentration of monosaccharides (disaccharides/monosaccharides) is 2.0 to 8.0,
   a ratio of a concentration of electron-localized catechins to the concentration of saccharides (electron-localized catechins/saccharides) is 1.8 to 4.0,
   a content ratio of furfural relative to geraniol (furfural/geraniol) is 0.5 to 3.0, and
   a concentration of catechins is 300 ppm to 920 ppm.

2. The green tea beverage packed in a container according to claim 1, wherein a ratio of the concentration of saccharides to a concentration of a soluble solid content derived from tea leaves (saccharides/(soluble solid content derived from tea leaves×100)) is 5.0 to 10.0.

3. The green tea beverage packed in a container according to claim 1, wherein a ratio of the concentration of electron-localized catechins to a concentration of a soluble solid content derived from tea leaves (electron-localized catechins/(soluble solid content derived from tea leaves×100)) is 15.0 to 20.0.

4. A method for manufacturing a green tea beverage packed in a container, comprising steps of:
   adjusting a concentration of saccharides, which is a sum of a concentration of monosaccharides and a concentration of disaccharides, to 150 ppm to 500 ppm;
   adjusting a ratio of the concentration of disaccharides to the concentration of monosaccharides (disaccharides/monosaccharides) to 2.0 to 8.0;
   adjusting a ratio of a concentration of electron-localized catechins to the concentration of saccharides (electron-localized catechins/saccharides) to 1.8 to 4.0;
   adjusting a content ratio of furfural to geraniol (furfural/geraniol) to 0.5 to 3.0 in the green tea beverage; and
   adjusting a concentration of catechins to 300 ppm to 920 ppm,
   wherein the green tea beverage has an extraction of green tea as its major component.

5. A method for improving flavor of a green tea beverage packed in a container, comprising steps of:
   adjusting a concentration of saccharides, which is a sum of a concentration of monosaccharides and a concentration of disaccharides, to 150 ppm to 500 ppm;
   adjusting a ratio of the concentration of disaccharides to the concentration of monosaccharides (disaccharides/monosaccharides) to 2.0 to 8.0;
   adjusting a ratio of a concentration of electron-localized catechins to the concentration of saccharides (electron-localized catechins/saccharides) to 1.8 to 4.0;
   adjusting a content ratio of furfural to geraniol (furfural/geraniol) to 0.5 to 3.0 in the green tea beverage; and
   adjusting a concentration of catechins to 300 ppm to 920 ppm,
   wherein the green tea beverage has an extraction of green tea as its major component.

* * * * *